(12) United States Patent
Kfoury (10) Patent No.: US 7,373,692 B2
(45) Date of Patent: May 20, 2008

(54) PARALLEL PLANE ROTATION HINGE FOR A PORTABLE DEVICE

(75) Inventor: Tony Kfoury, Lisle, IL (US)

(73) Assignee: Amphenol-T&M Antennas, Vernon Hills, IL (US)

( * ) Notice: Subject to any disclaimer, the term of this patent is extended or adjusted under 35 U.S.C. 154(b) by 0 days.

(21) Appl. No.: 11/149,458

(22) Filed: Jun. 8, 2005

(65) Prior Publication Data

US 2005/0276412 A1 Dec. 15, 2005

Related U.S. Application Data

(60) Provisional application No. 60/578,085, filed on Jun. 8, 2004.

(51) Int. Cl.
*E05F 1/08* (2006.01)

(52) U.S. Cl. .............................. 16/308; 16/327; 16/334

(58) Field of Classification Search .................. 16/330, 16/303, 327, 334; 455/575.3, 575.8, 90.3; 248/917–921; 361/680–682
See application file for complete search history.

(56) References Cited

U.S. PATENT DOCUMENTS

| 571,133 | A | 11/1896 | Hoffman |
| 3,898,708 | A | 8/1975 | Swozdz |
| 4,215,449 | A | 8/1980 | Loikitz |
| 4,897,873 | A | 1/1990 | Beutler et al. |
| 5,111,503 | A | 5/1992 | Takagi |
| 5,138,743 | A | 8/1992 | Hoffman |
| 5,152,029 | A | 10/1992 | Pai |
| 5,257,310 | A | 10/1993 | Takagi et al. |
| 5,265,311 | A | 11/1993 | Gard |
| 5,325,984 | A | 7/1994 | Ady et al. |
| 5,629,979 | A | 5/1997 | Domoleczny |
| 5,649,309 | A | 7/1997 | Wilcox et al. |
| 5,651,063 | A | 7/1997 | Ji et al. |
| 5,666,694 | A | 9/1997 | Slow et al. |
| 5,697,124 | A | 12/1997 | Jung |
| 5,881,150 | A | 3/1999 | Persson |
| 5,905,796 | A | 5/1999 | Jung |
| 5,937,062 | A | 8/1999 | Sun et al. |
| 6,035,491 | A | 3/2000 | Hartigan et al. |
| 6,065,187 | A | 5/2000 | Mischenko |
| 6,070,298 | A | 6/2000 | Sorimachi |
| 6,081,969 | A | 7/2000 | Tanahashi et al. |
| 6,088,240 | A | 7/2000 | Steinhoff et al. |
| 6,104,916 | A | 8/2000 | Steinhoff et al. |
| 6,115,886 | A | 9/2000 | Fujita |

(Continued)

FOREIGN PATENT DOCUMENTS

CN 1487373 4/2004

(Continued)

*Primary Examiner*—Katherine Mitchell
*Assistant Examiner*—Ruth C. Rodriguez
(74) *Attorney, Agent, or Firm*—Greer, Burns & Crain, Ltd.

(57) ABSTRACT

Parallel plane rotation hinge for a portable device. The hinge includes a pin defining a rotational axis and a cam having an inner cam track and an outer cam track. A bushing is rotationally fixed and axially slidable with respect to the pin, and includes inner and outer followers for respectively rotationally engaging the inner and outer cam tracks. A biasing member is disposed about the pin to bias the bushing against the cam.

11 Claims, 13 Drawing Sheets

U.S. PATENT DOCUMENTS

| | | | |
|---|---|---|---|
| 6,122,801 A * | 9/2000 | Reichert et al. | 16/284 |
| 6,125,509 A | 10/2000 | Hartigan et al. | |
| 6,141,831 A | 11/2000 | Novin et al. | |
| 6,148,079 A | 11/2000 | Chintala et al. | |
| 6,149,442 A | 11/2000 | Enright | |
| 6,175,990 B1 | 1/2001 | Kato et al. | |
| 6,209,173 B1 | 4/2001 | Salter et al. | |
| 6,217,137 B1 | 4/2001 | Bitbaba et al. | |
| 6,256,481 B1 | 7/2001 | Jeong et al. | |
| 6,292,980 B1 | 9/2001 | Yi et al. | |
| 6,295,358 B1 | 9/2001 | Kubota | |
| 6,301,489 B1 | 10/2001 | Winstead et al. | |
| 6,367,122 B1 | 4/2002 | Tagawa | |
| 6,409,042 B1 | 6/2002 | Hirano et al. | |
| 6,430,776 B1 | 8/2002 | Tan et al. | |
| 6,438,228 B1 | 8/2002 | Jeong et al. | |
| 6,445,577 B1 | 9/2002 | Madsen et al. | |
| 6,470,175 B1 | 10/2002 | Park et al. | |
| 6,539,580 B2 | 4/2003 | Lim | |
| 6,618,903 B2 | 9/2003 | Kim | |
| 6,634,061 B1 | 10/2003 | Maynard | |
| 6,886,221 B2 * | 5/2005 | Minami et al. | 16/324 |
| 7,027,294 B2 * | 4/2006 | Kato | 361/679 |
| 2002/0123366 A1 | 9/2002 | Doraiswamy et al. | |
| 2002/0152581 A1 | 10/2002 | Lim | |
| 2002/0162191 A1 | 11/2002 | Chen | |
| 2002/0178546 A1 | 12/2002 | Kim | |
| 2002/0198016 A1 | 12/2002 | Gupte | |
| 2003/0000046 A1 | 1/2003 | Liao | |
| 2003/0040288 A1 | 2/2003 | Kang et al. | |
| 2003/0097732 A1 | 5/2003 | Kim | |
| 2003/0118179 A1 | 6/2003 | Barnett et al. | |
| 2003/0125094 A1 | 7/2003 | Hyun et al. | |
| 2003/0126720 A1 | 7/2003 | Huang | |
| 2003/0162509 A1 | 8/2003 | Bae et al. | |
| 2003/0163899 A1 | 9/2003 | Pan et al. | |
| 2003/0163901 A1 | 9/2003 | Pan et al. | |
| 2003/0172495 A1 | 9/2003 | Pan | |
| 2003/0234743 A1 | 12/2003 | Ponce De Leon et al. | |
| 2004/0014343 A1 | 1/2004 | Ryu et al. | |
| 2004/0020012 A1 | 2/2004 | Gupte | |
| 2004/0023700 A1 | 2/2004 | Gupte | |
| 2004/0045131 A1 | 3/2004 | Barnett | |
| 2004/0049884 A1 | 3/2004 | Kim | |
| 2004/0192422 A1 * | 9/2004 | Watanabe et al. | 455/575.3 |
| 2004/0203532 A1 * | 10/2004 | Mizuta | 455/90.3 |
| 2004/0244147 A1 * | 12/2004 | Qin et al. | 16/330 |
| 2006/0005356 A1 * | 1/2006 | Amano et al. | 16/341 |

FOREIGN PATENT DOCUMENTS

| | | | |
|---|---|---|---|
| GB | 2324830 | | 11/1998 |
| JP | 10196636 | | 7/1998 |
| JP | 10281138 | | 10/1998 |
| JP | 10315242 | | 12/1998 |
| JP | 11050735 | * | 2/1999 |
| JP | 11063514 | | 3/1999 |
| JP | 2000186710 | | 7/1999 |
| JP | 2000068659 | | 3/2000 |
| JP | 2003176918 | | 6/2003 |
| JP | 2004118409 | | 4/2004 |

* cited by examiner

PARALLEL PLANE ROTATION HINGE FOR A PORTABLE DEVICE

PRIORITY CLAIM

This application claims the benefit of U.S. Provisional Patent Application Ser. No. 60/578,085, filed Jun. 8, 2004, under 35 U.S.C. § 119.

BACKGROUND OF THE INVENTION

The present invention relates generally to portable devices. The present invention relates more particularly to hinges for portable devices.

Portable devices with hinged connections provide many advantages and are popular. Flip-style portable devices, for example, are a very popular form for handsets and personal digital assistants. Generally, in flip-style devices, one part may be considered a main part and the other part a flip part. A hinged connection provides controlled relative movement between the flip part and the main part. In the traditional flip-style connections, a flip part and main part are connected at a hinge axis that is generally in the plane of one or both of the flip part and the main part (or in a plane parallel to one of the flip part and the main part). This creates a clamshell-style open and close feature.

Flip-style devices form a convenient shape, and such devices have proven to be aesthetically pleasing to a large segment of the consumer market. When closed, flip-style devices provide a small device footprint, making the storage of the device in a pocket, on a clip, in a holder, in a briefcase, in a purse, or a drawer, etc., very convenient.

A hinge used to form a hinged connection in a portable device is in a very demanding environment. Operational cycles are high frequency, meaning that users of hinged portable devices open and close the device frequently. In the example of a flip phone, a user commonly opens and closes the device with each use of the device. A hinge should also provide a smooth and controlled operation, and should be biased to remain in respective open and closed positions. There is considerable interest, however, in keeping the hinge as simple and as inexpensive as possible.

SUMMARY OF THE INVENTION

Embodiments of the present invention provide a parallel plane rotation hinge for a portable device. The hinge includes a pin defining a rotational axis and a cam having an inner cam track and an outer cam track. A bushing is rotationally fixed and axially slidable with respect to the pin, and includes inner and outer followers for respectively rotationally engaging the inner and outer cam tracks. A biasing member is disposed about the pin to bias the bushing against the cam.

DETAILED DESCRIPTION

Preferred embodiments of the present invention provide a parallel plane rotation hinge for a portable device. As an alternative to traditional flip-style devices, in embodiments of the present invention, the hinge includes a rotational axis that, when the hinge is assembled into a portable device, preferably is generally perpendicular to the main part and the flip part, so that the flip part rotates via the hinge in a plane parallel to the plane of the main part. This provides a user-pleasing and unique operation.

Parallel plane rotational hinges provide an alternative to clamshell style handsets that is robust and stylish. However, preferred hinges according to the present invention also allow a portable device to retain the compact size and other desirable features of clamshell style handset openings. Preferred hinges further provide a smooth, controlled operation for opening and closing a portable device.

Preferably, to reduce cost, hinges in preferred embodiments are made from a relatively small number of parts. Further, hinges in preferred embodiments of the invention are self-contained, and they may be partially or fully assembled separately from a portable device into which the hinge will be inserted.

Preferred embodiments of the invention permit manual opening or self-opening (open-assist) to 180 degrees in either direction. The self-opening hinges may include button activation for convenient opening of a portable device.

Generally, parallel plane rotation hinges according to preferred embodiments of the present invention include a pin defining a rotational axis and a cam having an inner cam track and an outer cam track. A bushing is rotationally fixed and axially slidable with respect to the pin, and includes inner and outer followers for respectively rotationally engaging the inner and outer cam tracks. A biasing member disposed about the pin biases the bushing against the cam. The biasing member, for example, may provide smoother and more controlled movement for the hinge, and in particular embodiments, may provide a self-opening feature.

Preferred hinges are self-contained. A locking member may be provided for engaging an end of the pin to hold the cam axially. This allows a preferred hinge to be pre-assembled for insertion into a portable device.

The hinge may further include a stop slidable along a track and disposed within a rotational path of a part of the bushing. In this way, the bushing may engage the stop as it rotates. Further relative rotation of the bushing slides the stop until the stop engages an inner surface at either end of the track. Such engagement prevents further sliding of the stop and further rotation of the bushing. This prevents over-rotation of preferred embodiments of the hinge.

Particular embodiments of the hinge provide an interface between the inner and outer cam tracks and the inner and outer followers to respectively define a bias position. An exemplary bias position may resist relative rotation of the bushing (for example, providing initial resistance to opening the portable device). Alternatively, the cam may be configured for making the hinge unstable at a closing position (for example, providing an open-assist hinge). In the latter type of embodiment, a stop or stops may be provided for selectively and removably engaging a part of the bushing to inhibit rotation. A mechanism, such as a button and/or a lever, may be provided for moving the stop to allow relative rotation (for example, button activation for allowing opening of a portable device).

Figure 1A:
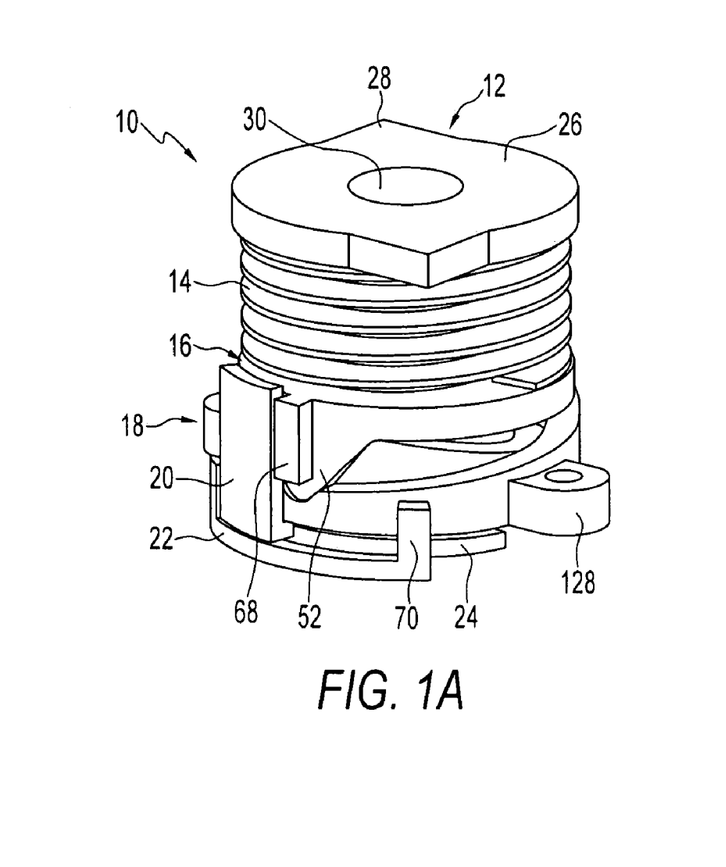
FIGS. 1A and 1B are perspective views of a parallel plane rotation hinge for a portable device, according to an embodiment of the present invention.
Figure 1B:
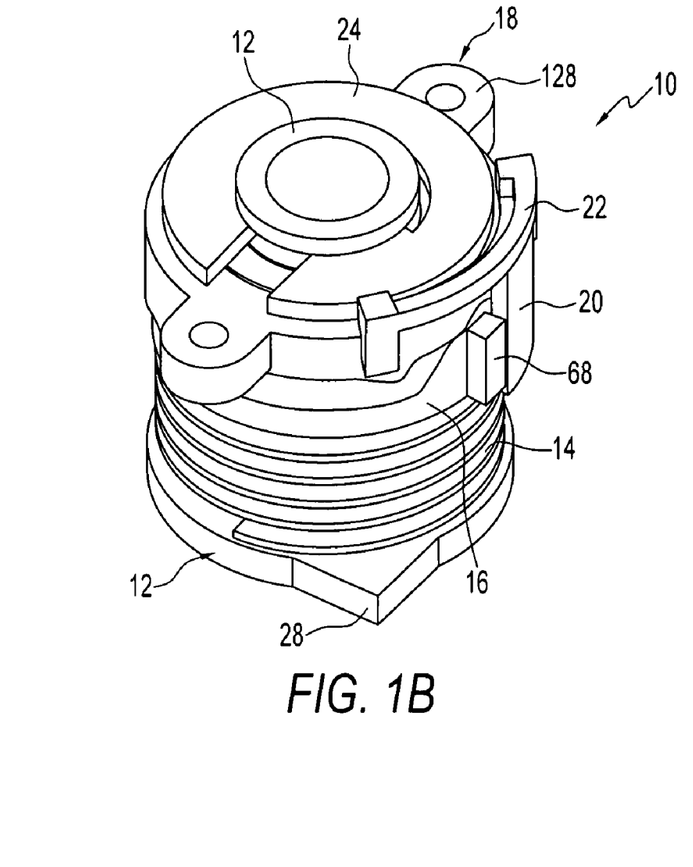

Referring now to the drawings, FIGS. 1A and 1B show top and bottom views, respectively, of a parallel plane rotation hinge 10 for use with a portable device (such as a handheld device) in a preferred embodiment. As shown in FIGS. 1A and 1B, the preferred hinge 10 is modular or self-contained, and can be preassembled for later insertion into the handheld device. As used here, the terms "top" and "bottom" regarding the hinge 10 refer to the orientations of FIGS. 1A and 1B respectively and are not intended to limit the invention to a particular orientation.

Figure 2:
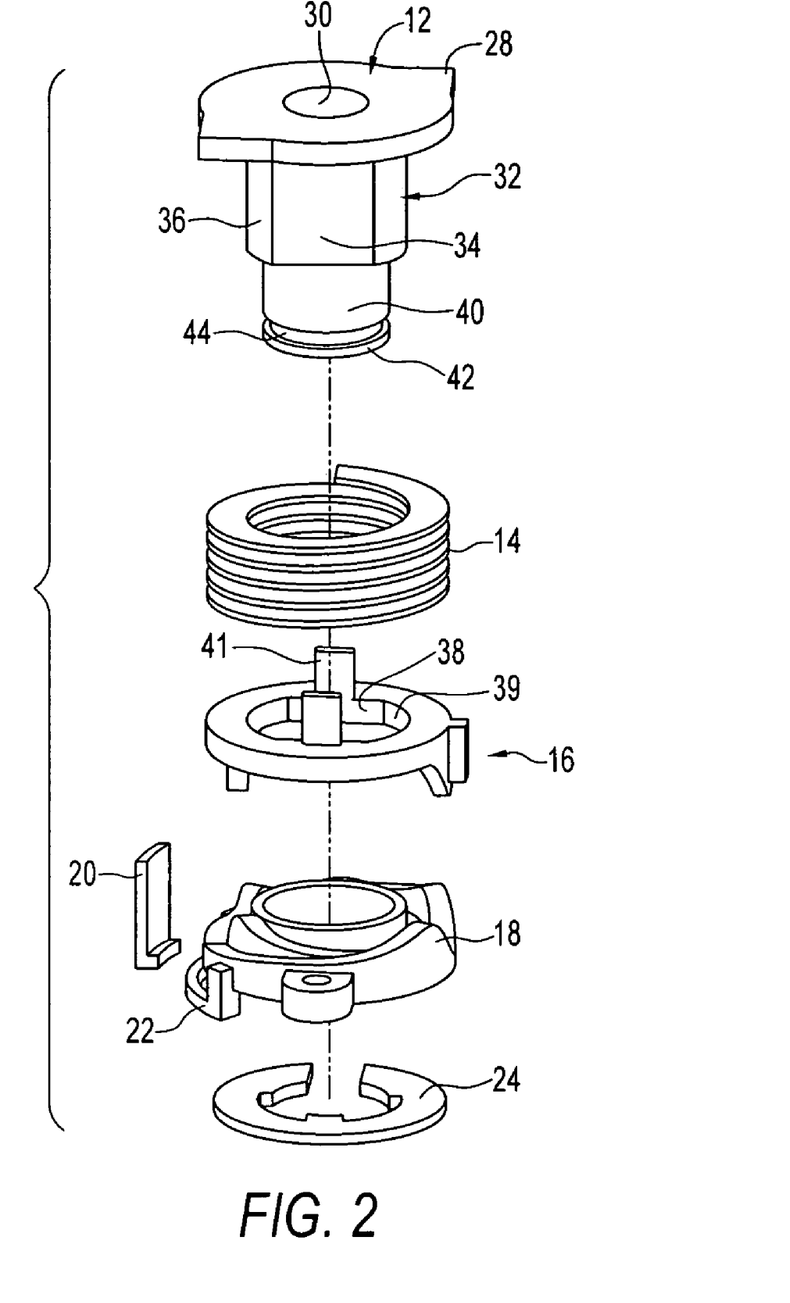
FIG. 2 is an exploded view of the hinge of FIGS. 1A and 1B.
Figure 3:
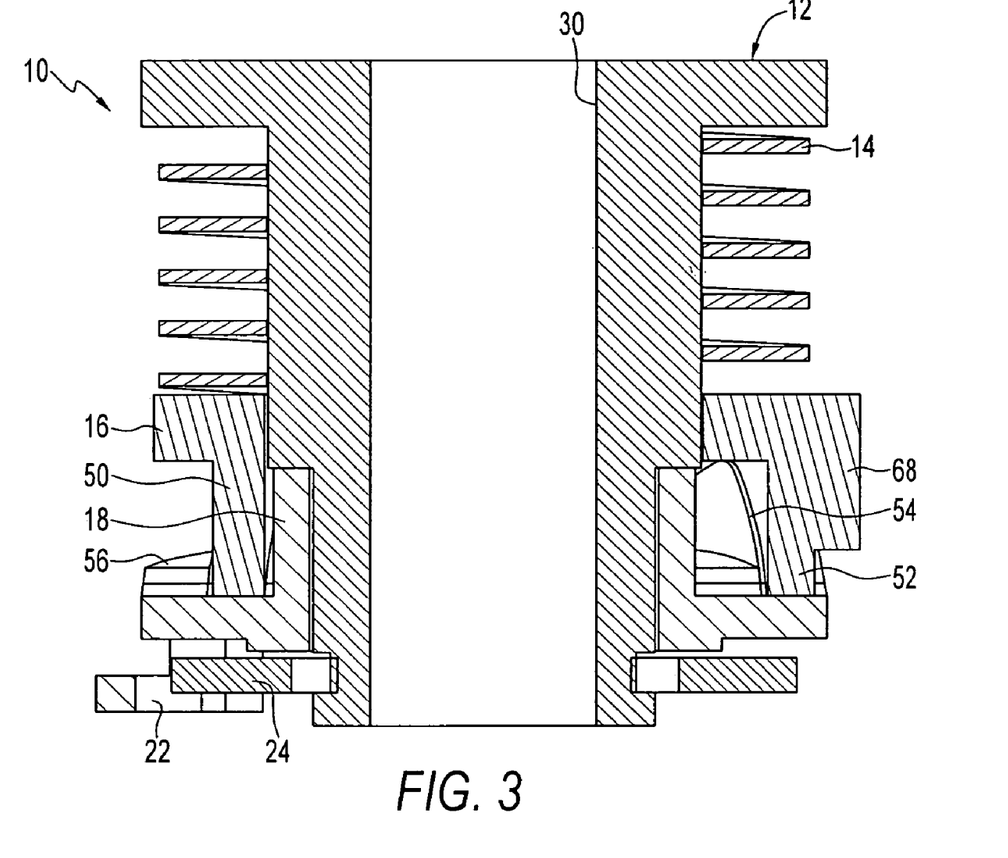
FIG. 3 is a sectional view of the hinge of FIGS. 1A and 1B.

Referring also to FIG. 2, the exemplary hinge 10 shown generally includes a pin-follower 12, a biasing member 14 illustrated in this embodiment as a coil spring with a flat cross-section, a bushing-follower 16 engaged with the pin-follower for co-rotational movement, a cam 18 engaged with the bushing-follower, a sliding stop 20 engaged with the cam and with a track 22 mounted to the cam, and an external lock ring 24 for engaging the pin-follower and maintaining assembly of the hinge.

The pin-follower 26, preferably made of a metal such as alloy steel with plating, defines a rotational axis. This rotational axis, when the hinge 10 is installed into a portable device, preferably is generally perpendicular to the planes of the flip part and the main part of a portable device. In a preferred embodiment, an upper end 26 of the pin-follower 12 includes a pair of projections 28 for engaging a flip part (e.g., cover) of the portable device, so that the flip part rotates as the pin-follower rotates with respect to the cam 18. In this way, the flip part is able to slide along a parallel direction with respect to the main part. The pin-follower 12 may engage the flip part of the portable device in any suitable manner for allowing the flip part to rotate with the pin-follower.

Referring now to FIGS. 1A, 1B, 2, and 3, the pin-follower 12 preferably includes an opening 30 through which a cable harness or twisted flex cable may be inserted for electrically connecting the flip part and the main part of the handheld device. As most clearly shown in FIG. 2, the pin-follower 12 has an outer engaging surface 32, which includes a pair of opposing flat surfaces 34 and a pair of opposing round surfaces 36. The flat surfaces 34 engage inner flat surfaces 38 of the bushing-follower 16, and the rounded surfaces 36 engage inner round surfaces 40 of the bushing-follower. In this way, the pin-follower 12 is rotationally fixed but axially slidable with respect to the bushing-follower 16. A pair of slide alignment ribs 41 extends axially from the bushing-follower 16 for aligning axial movement of the pin-follower 12 relative to the bushing-follower.

The pin-follower 12 further includes an inner extension 40, which preferably extends through a center of the cam 18, and terminates in an end 42 having a groove 44. The groove 44 engages the external lock ring 24 when the hinge 10 is assembled. This holds the cam 18 axially, thus maintaining assembly of the hinge 10, and further allows the hinge to be pre-assembled before insertion into a portable device. The lock ring 24 is preferably made of a metal such as carbon steel.

Figure 4:
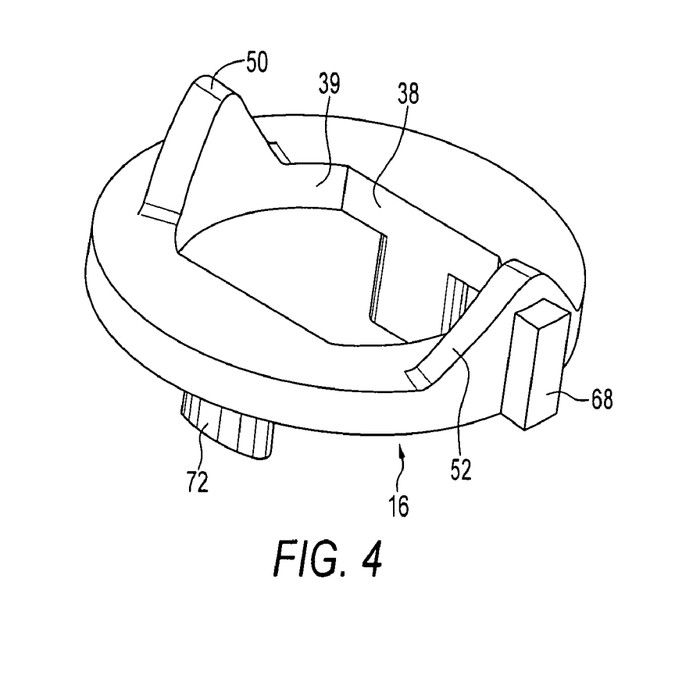
FIG. 4 is a perspective view of a bushing for the hinge of FIGS. 1A and 1B.
Figure 5:
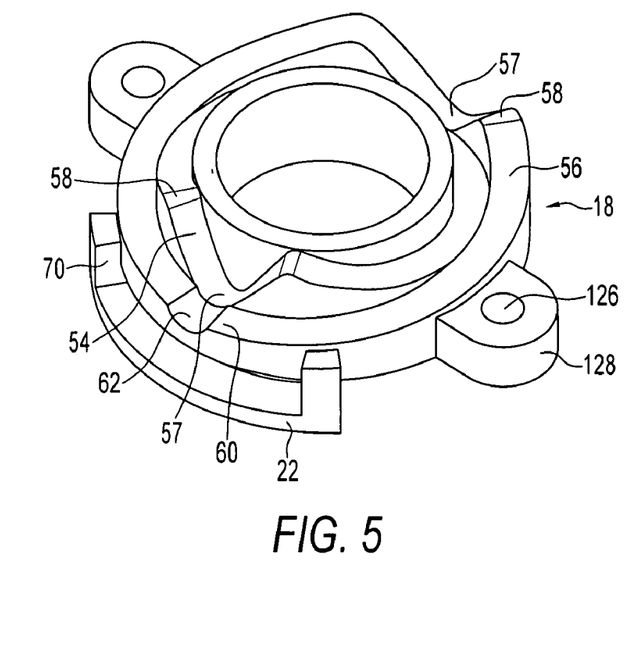
FIG. 5 is a perspective view of a cam for the hinge of FIGS. 1A and 1B.

Referring now to FIGS. 4 and 5, the bushing-follower 16, also preferably made of a metal such as alloy steel with plating, includes a radially inner follower 50 and a radially outer follower 52, for respectively rotationally engaging concentric inner and outer cam tracks 54 and 56 of the cam 18. Use of the inner and outer followers 50, 52 and cam tracks 54, 56 in a preferred embodiment allow balanced forces for relative rotation of the bushing-follower 16, and they further provide rotation in either direction up to 180 degrees (for example) between a closed position and an open position. The cam 18 preferably is made of a metal such as alloy steel with plating.

Figure 6A:
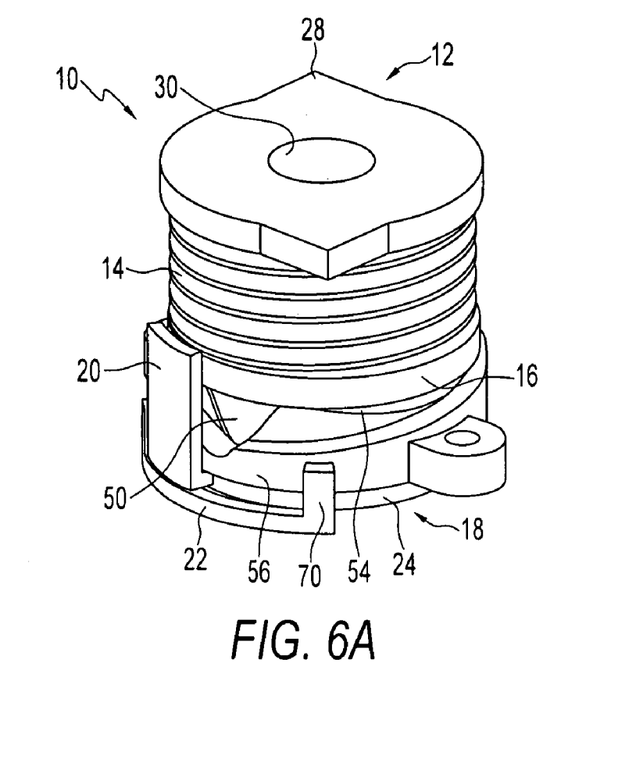
FIGS. 6A and 6B are perspective views of the hinge of FIGS. 1A and 1B in a closed position.
Figure 6B:
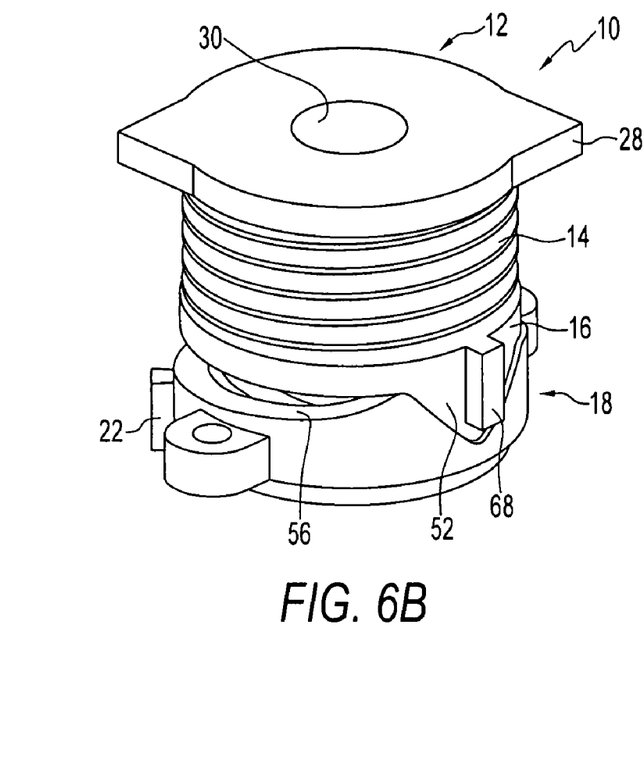

As shown in FIG. 5, an interface is provided between the inner and outer cam tracks 54 and 56 and the inner and outer followers 50, 52 to respectively define a bias position resisting relative rotation of the bushing-follower 16, providing a manual opening hinge. For example, the cam tracks 54, 56 each include a profile having a lower initial area 57 where the followers 50, 52 are initially disposed (a closed position, as shown in FIGS. 6A and 6B), a peak 58, and a shallow area 60 that is 180 degrees away from the initial area (open position). A small detent 62 is provided in the shallow area to retain a position of the followers 50, 52 in the open position.

The biasing member 14 is disposed about the pin-follower 12 and preferably about the ribs 41 (providing a spring stop), and biases the bushing-follower 16 against the cam 18. The biasing member 14, which in a preferred embodiment is a coil spring having a flat cross-section, provides resistance to opening and closing the hinge 12, and preferably provides a controlled, smooth movement for operation of the hinge 10. Preferably, the biasing member 14 is made of a metal, for example, carbon steel.

Figure 7:
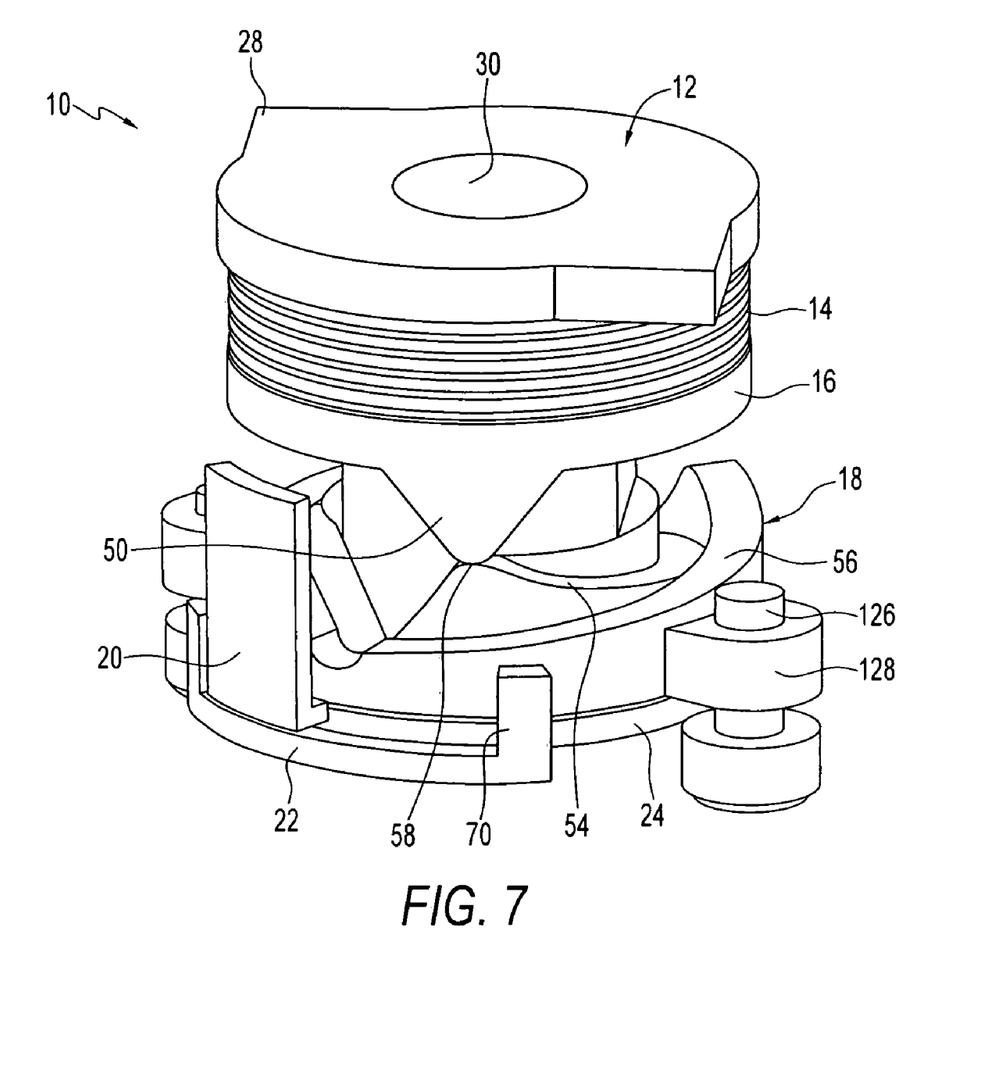
FIG. 7 is a perspective view of the hinge of FIGS. 1A and 1B in a partially open position.
Figure 8:
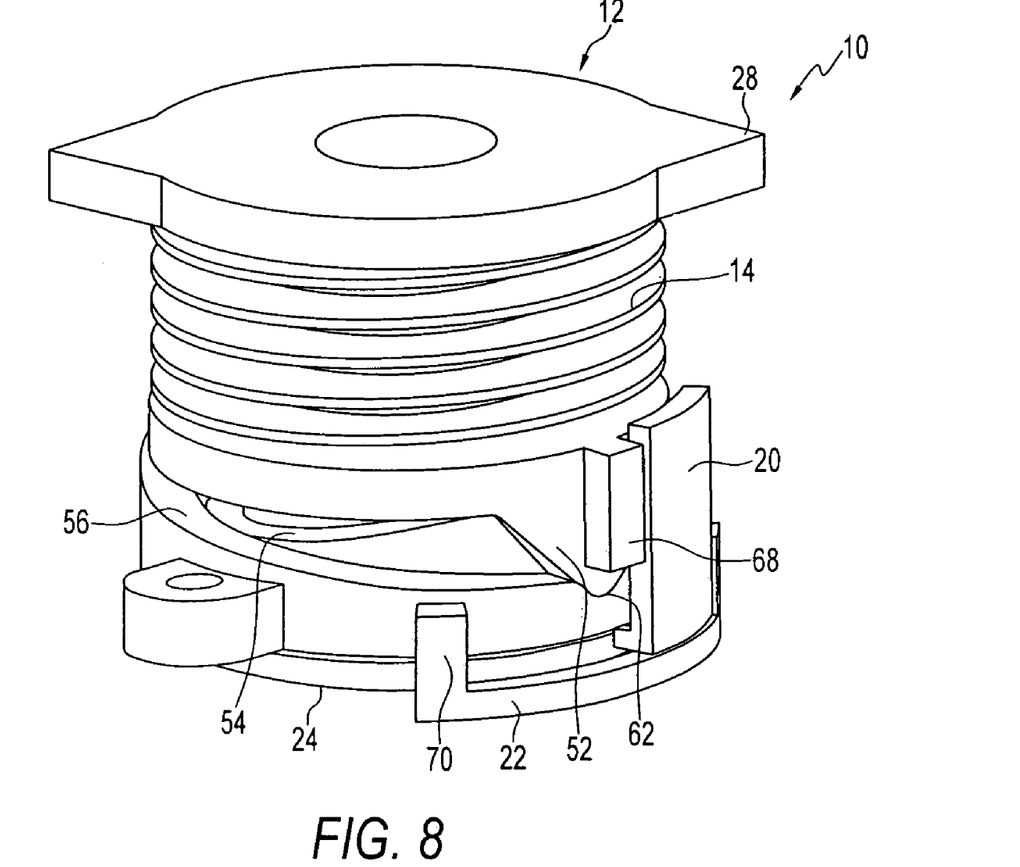
FIG. 8 is a perspective view of the hinge of FIGS. 1A and 1B in a fully open position.

As shown in FIG. 7, the pin-follower 12 and the bushing-follower 16 are rotated slightly in the clockwise direction such that the followers 50, 52 engage the peaks 58 of the cam tracks 54, 56 respectively. At this position, the biasing member 14 preferably is at its maximum spring force and the cam followers 50, 52 are at maximum travel. FIG. 8 shows the hinge 10 at a fully opened position. In this position, the followers 50, 52 preferably are both engaged in the detent 62 at the shallow area 60 of the inner and outer cam tracks 54, 56.

Figure 9A:
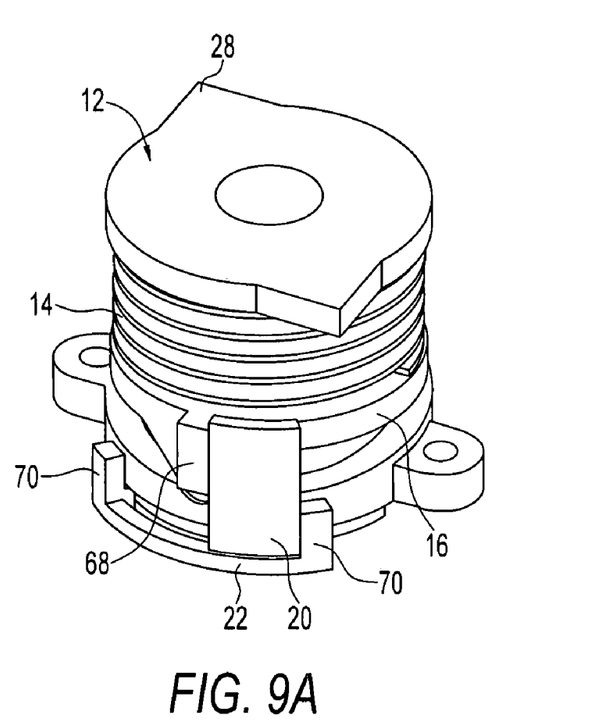
FIGS. 9A and 9B are perspective views of the hinge of FIGS. 1A and 1B, showing a stop mechanism for stopping rotation at 180° in respective directions.
Figure 9B:
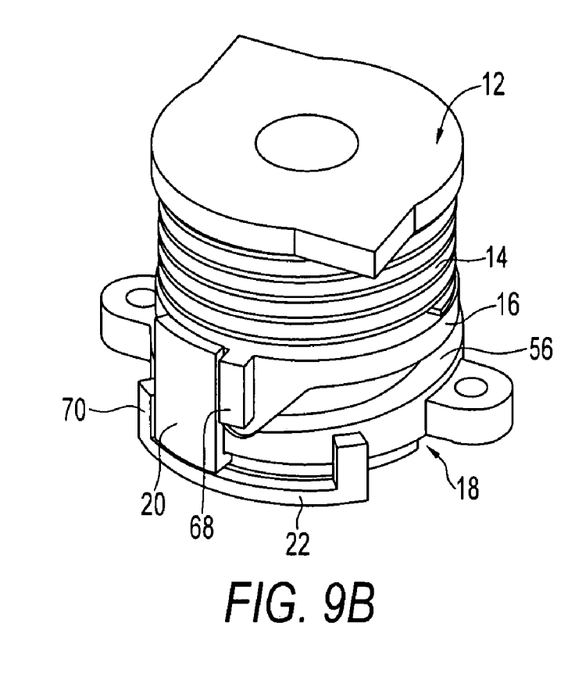

As also shown in FIG. 8 and FIGS. 9A and 9B, the bushing-follower 16 engages the stop 20 via a stop rib 68, which is disposed on the outer follower 52 of the bushing-follower 16, to prevent over-rotation of the hinge 10. The stop 20, which may be made, for example, of injection-molded acetal, is slidable along the track 22 and disposed within the rotational path of the stop rib 68. The track 22 is fixed relative to the cam 18, and defines an arc concentric with the inner cam track 54 and 56. In a preferred embodiment, the track 22 is mounted to the cam 18, and more preferably engages the cam 18 (for example, snaps) so that a part of the stop 20 slides along the track between the track and the cam. In this way, the track 22 and the stop 20 can easily be assembled into the modular hinge 10. Ends 70, and more particularly opposing inner surfaces of the ends 70, define the track. In other words, the ends 70 define the maximum travel path of the stop 20 in either rotational direction.

In operation, as the bushing-follower 16 rotates in either direction, the stop rib 68 engages the stop 20. The stop 20 slides along the track 22, pushed along by the stop rib 68 as it rotates relative to the cam 18, until the stop engages an end 70. At this point, the stop 20 is held against rotation, and thus the stop rib 68 is also held against rotation. This stops relative rotation of the bushing-follower 16 at 180 degrees (in a preferred embodiment) in either direction, and prevents over-rotation of the hinge.

For example, as shown in FIG. 9A, as the bushing-follower 16 is rotated in a counterclockwise direction, the stop rib 68 engages the stop 20 from its left side, causing the stop to slide along the track 22 until the stop engages the end 70, whereby the stop is restricted from further movement. Engagement of the stop rib 68 with the stop 20 thus prevents further relative rotation by the bushing-follower 16 and the pin-follower 12, along with the flip part preferably engaged with the pin-follower. Similarly, as shown in FIG. 9B, as the bushing-follower 16 is rotated in a clockwise direction, the stop rib 68 engages the stop 20 from its right side and slides the stop along the track 22 until the stop engages the end 70. At this point, the bushing-follower 16 and the pin-follower 12 are inhibited from further rotation relative to the cam 18. Thus, over-rotation of the hinge is prevented.

Accordingly, the preferred hinge 10 provides a modular, self-contained assembly, a preferably small overall volume, and flexibility for mounting to housing of a portable device. In preferred embodiments, a small number of parts having preferably small sizes are required, assembly can made simple, and one or more of the parts can be standardized, such as the biasing member 14 and the lock ring 24. The hinge 10 can be configured as needed to adjust a required opening torque, resistance, hinge performance, etc.

Though the hinge 10 may be designed for manual actuation, in an alternative embodiment, a hinge may instead be provided with an open-assist feature. In such a hinge, for example, the cam tracks may be configured to make the hinge unstable in the closed position. Further, the hinge may be selectively activated to move a handheld device into an open position, for example, using button activation.

Figure 10:
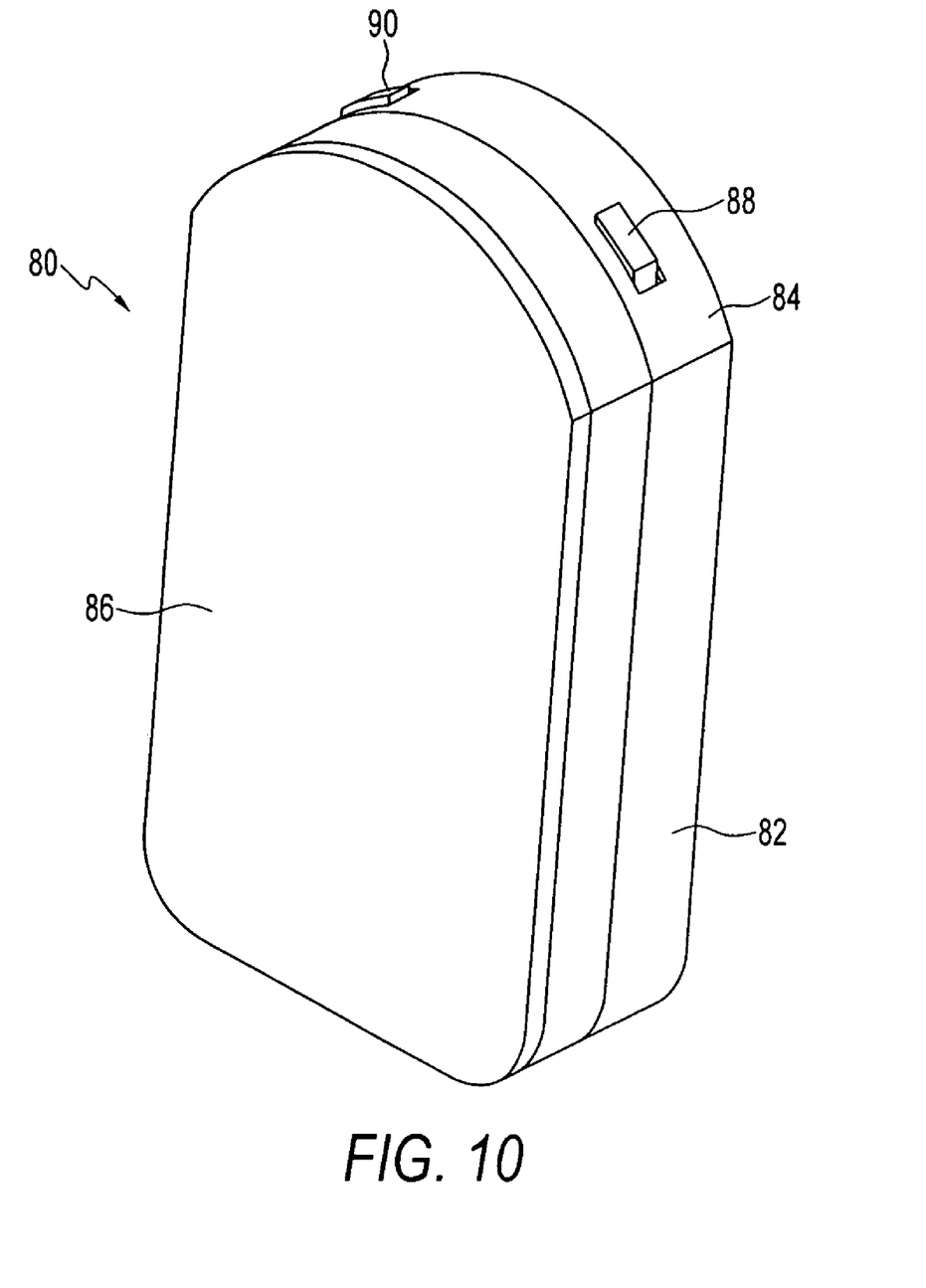
FIG. 10 is a perspective view of a portable device for use with a hinge according to another embodiment of the present invention.

As shown in FIG. 10, for example, a handheld device 80 includes a housing 82 having a main part 84 and a flip part 86. The main part 84 includes a pair of right and left buttons 88, 90 for allowing rotation of an alternative hinge. In the portable device shown in FIG. 10, the buttons 88, 90 are placed on top of the device 80 (as oriented in FIG. 10), which may be preferable in particular instances to minimize their size and/or for ergonomic benefits, for example. However, it is contemplated that the buttons 88, 90 may be positioned or configured in ways other than that shown in FIG. 10. A similar portable device as the handheld device 80 may be used with the manual open hinge 10, though the buttons 88, 90 may be omitted.

Figure 11:
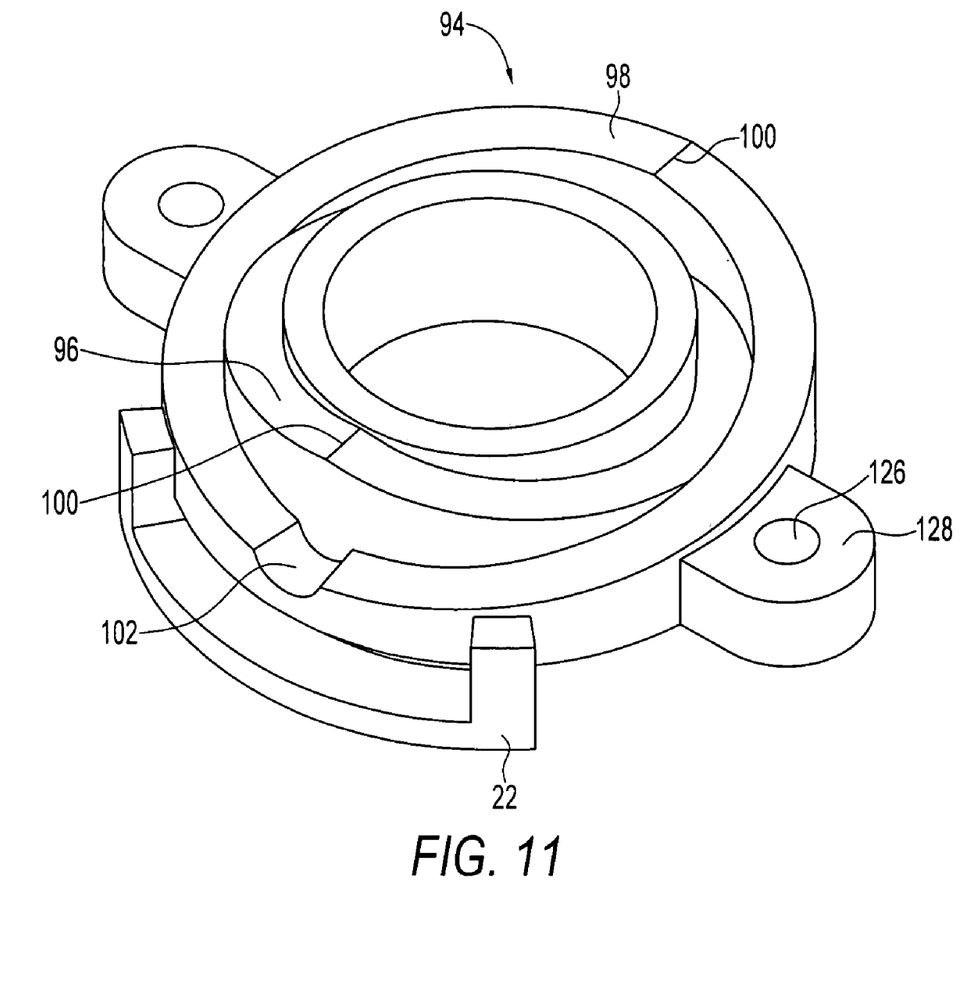
FIG. 11 is a perspective view of a cam for an alternative hinge.
Figure 12:
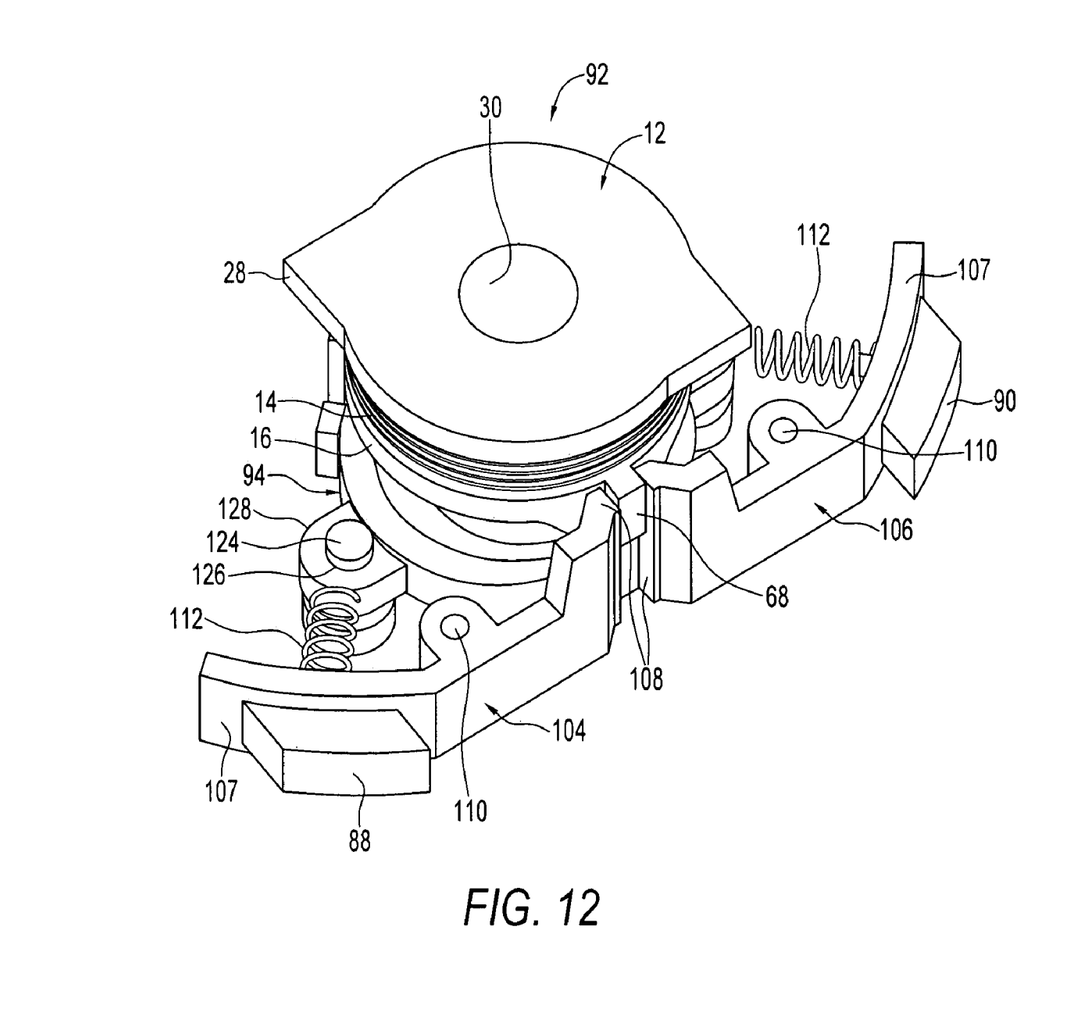
FIG. 12 is a perspective view of an alternative hinge and a stop mechanism, according to an alternative embodiment of the present invention.

According to an alternative embodiment, and referring to FIGS. 11 and 12, a preferred open-assist hinge 92 is provided that is biased toward an opened position. Engaging the buttons 88, 90 allows the hinge 92 to provide relative rotation in either the clockwise or counterclockwise direction. In an exemplary hinge 92, the pin-follower 12, the bushing-follower 16, the stop 20, the track 22, and the lock ring 24 may be the same or similar to that used in the manual rotation hinge 10. However, in the exemplary open-assist hinge 92, a cam is provided for making the hinge unstable in a closed position.

For example, as shown in FIG. 11, cam 94 includes inner and outer tracks 96, 98, each having a profile including a ramp from a peak 100 at a closed position to a small detent 102 at an open position. As with the manual open hinge 10, use of concentric inner and outer tracks 96, 98 preferably provides balanced movement and 180 degree rotation in either the clockwise or counterclockwise direction. However, as opposed to the cam 18 in the manual open hinge 10, the cam 94 provides an open-assist feature by making the hinge unstable in the closed position.

As shown in FIG. 12, for example, the buttons 88, 90 are part of (or alternatively may be engaged with) a mechanism for selectively opening the handheld device 80 in either the clockwise or the counterclockwise direction. Preferably, the mechanism includes levers 104, 106, each of which include the button 88, 90 generally at one end and an inner engaging surface 108 at an opposing end.

The preferably molded plastic levers 104, 106 are pivotally connected, for example, to the main part 84 of the portable device 80 (see FIG. 14B) via rotation points/fulcrums 110. The buttons 88, 90 are disposed at one end 107 and inner surfaces 108 are disposed at the opposing end. To inhibit relative rotation of the bushing-follower 16, the inner surfaces 108 are removably disposed within both a clockwise and a counter-clockwise rotational path of the stop rib 68. Biasing members such as coil springs 112 bias the buttons 88, 90 outward (for example, to the position shown in FIG. 12), and due to the levers 104, 106 the springs hold the inner surfaces 108 in engagement with the stop rib 68. Selective actuation of either button 88, 90 moves one of the inner surfaces 108 out of the relative rotational path of the stop rib 68, allowing relative rotation of the bushing-follower 16 and thus the pin-follower 12.

Figure 13:
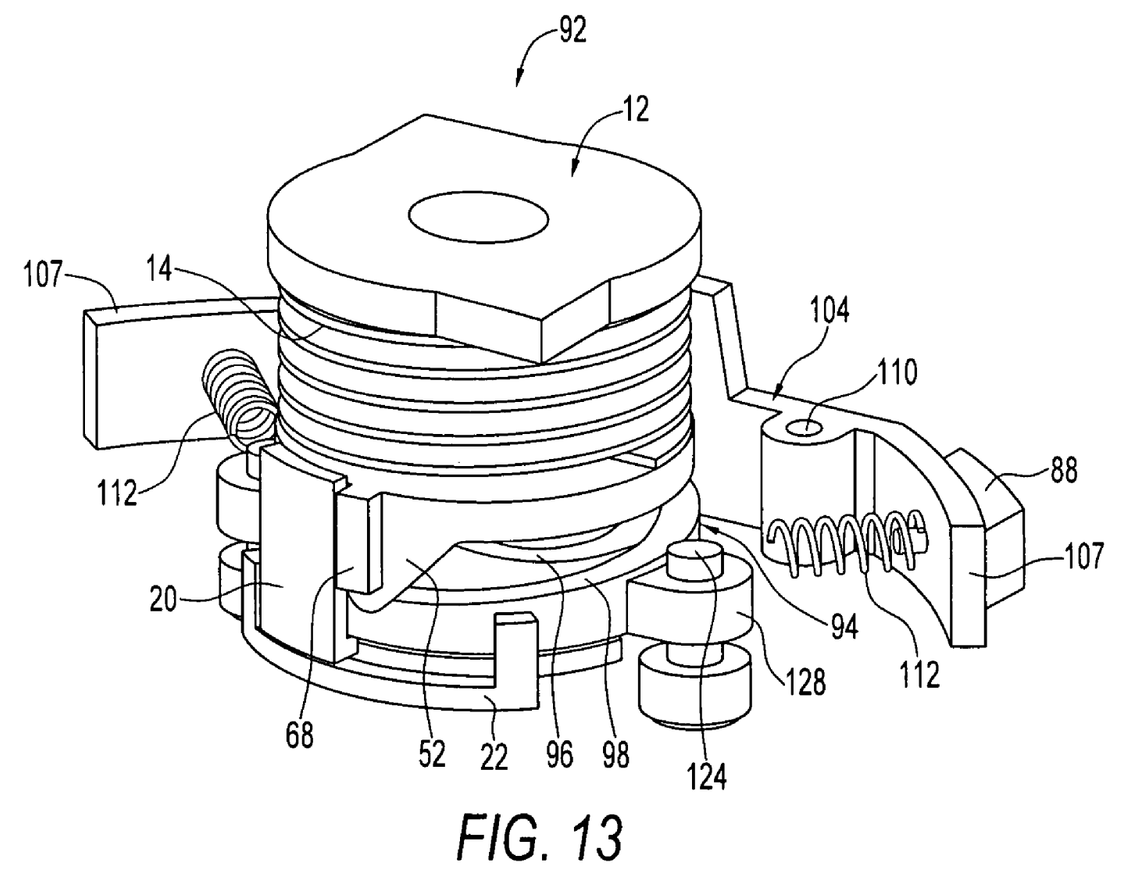
FIG. 13 is a perspective view of the alternative hinge of FIG. 12 in a fully open position, showing a stop mechanism.

For example, referring again to FIG. 10, pushing the right button 88 causes the flip part (cover) 86 to rotate in the clockwise direction, towards the left. By contrast, pushing the left button 90 causes the flip part 86 to rotate in the counterclockwise direction, towards the right. FIG. 13 shows the hinge 92 in the fully open (180 degree) position. As shown, the stop 20 prevents over-rotation, as with the operation of the manual open hinge 10.

Figure 14A:
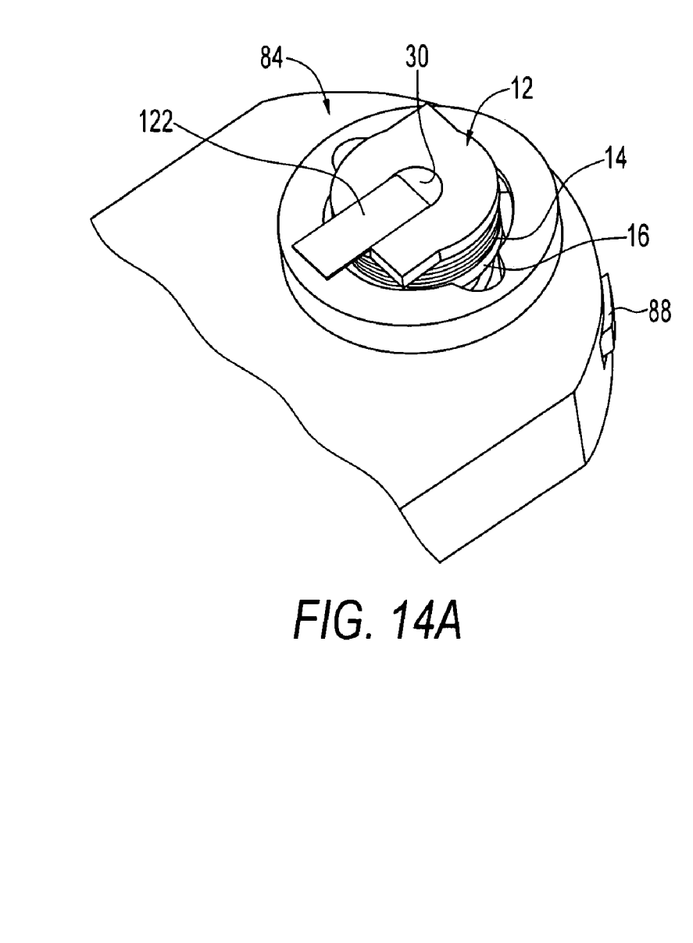
FIGS. 14A and 14B are perspective top and bottom views, respectively, showing assembly of the hinge of FIG. 12 into the portable device of FIG. 10.
Figure 14B:
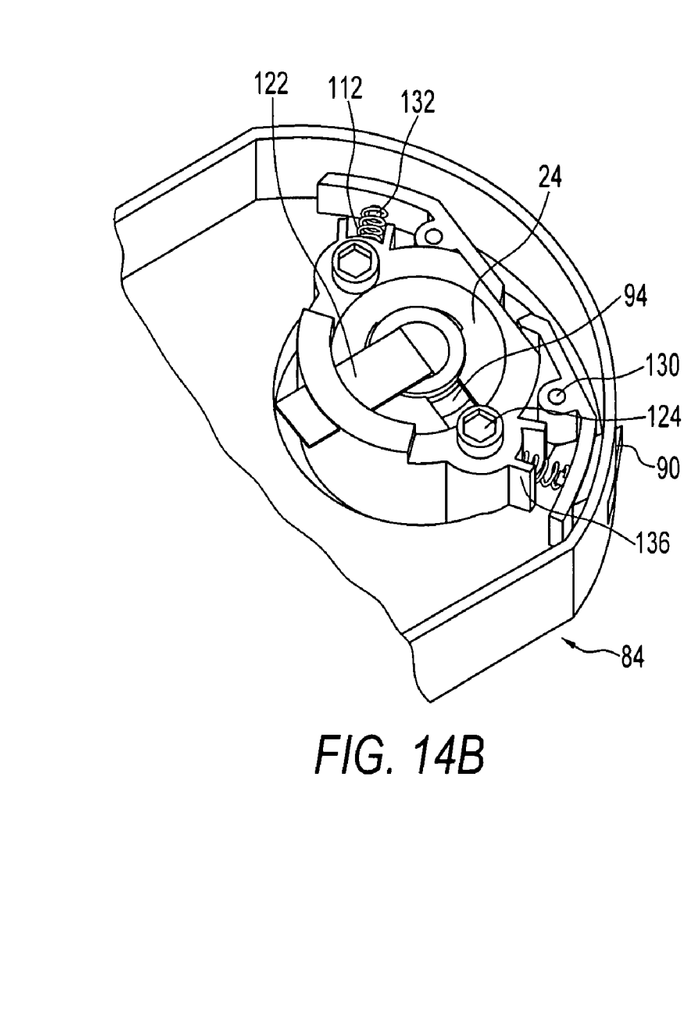

FIGS. 14A and 14B illustrate an exemplary assembly method of the hinge 92 into the handheld device 80. After pre-assembly of the hinge 92 and insertion of the hinge into the main part 84 of the handheld device 80, screws 124 engage threaded openings 126 with an ear 128 of the cam 94. The screws 124 lock the assembled hinge 92 into the main part 84. The levers 104, 106 including buttons 88, 90 may be slid into place, and the fulcrums 110 may be pivotally engaged to the main part 84 via bolts 130, for example. The biasing members 112 may be disposed about bolts 132 mounted to the outer ends 107 of the levers 104, 106 at one end and engaged with the main part 84 at the opposing end. Guides 136 may be provided in the main part 84 to prevent slippage of the biasing members 112 with respect to the levers 104, 106 and the main part 84.

To complete assembly, the projections 28 may be locked into the flip part 86 to provide co-rotation, and may be otherwise connected to the flip part 86 in a suitable manner. In this exemplary assembly method, the hinge 92 may be assembled independently of the main part 84 and then inserted into the main part 84 for providing controlled and/or assisted opening of the flip part 86 with respect to the main part 84. Assembly of the hinge 10 is similar to that of hinge 92, except the levers 104, 106 and the biasing members 112 may be omitted.

Example information about opening angles as well as materials for preferred embodiments is presented herein for illustrating preferred embodiments but is not intended to limit the invention in its broader aspects. However, the angles and/or materials described herein may be especially well-suited for portable devices such as handsets, and particularly cell phones.

While specific embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the present invention are set forth in the appended claims.

What is claimed is:

1. A parallel plane rotation hinge for a portable device comprising:
   a pin defining a rotational axis;
   a cam having an inner cam track and an outer cam track;
   a bushing rotationally fixed and axially slidable with respect to said pin, said bushing including inner and outer followers for respectively rotationally engaging the inner and outer cam tracks;
   a biasing member disposed about said pin to bias said bushing against said cam;
   a track fixed relative to said cam and extending along a direction concentric with the inner cam track and the outer cam track, the track being defined between opposing inner surfaces;
   a stop slidable along said track and disposed within a rotational path of a part of said bushing such that the part of said bushing engages said stop during relative rotation of said bushing, and such that further relative rotation of the part of said bushing slides said stop until said stop engages one of the opposing inner surfaces.

2. The hinge of claim 1 wherein said cam is disposed about said pin, and further comprising:
   a locking member for engaging an end of said pin to hold said cam axially.

3. The hinge of claim 1 wherein an interface between the inner and outer cam tracks and the inner and outer followers respectively defines a bias position resisting relative rotation of said bushing.

4. The hinge of claim 1 wherein an interface between the inner and outer cam tracks and the inner and outer followers provides an unstable closed position for the hinge.

5. The hinge of claim 1 wherein said inner and outer cam tracks include a detent for retaining the inner and outer followers when said pin is rotated about 180 degrees.

6. A parallel plane rotation hinge for a portable device comprising:
   a pin defining a rotational axis;
   a cam having an inner cam track and an outer cam track;
   a bushing rotationally fixed and axially slidable with respect to said pin, said bushing including inner and outer followers for respectively rotationally engaging the inner and outer cam tracks;
   a biasing member disposed about said pin to bias said bushing against said cam;
   a pair of inner surfaces, each of said pair of inner surfaces selectively and removably engaging a part of said bushing in a counter-direction to a rotational path of said bushing for inhibiting relative rotation of said bushing; and
   a mechanism for selectively moving either of said pair of inner surfaces out of the rotation path of said bushing;
   wherein an interface between the inner and outer cam tracks and the inner and outer followers provides an unstable closed position for the hinge.

7. A parallel plane rotation hinge for a portable device comprising:
   a pin defining a rotational axis;
   a cam disposed about said pin, said cam having an inner cam track and an outer cam track, the outer cam track being rotationally fixed to the inner cam track and concentric with the inner cam track;
   a follower disposed about said pin, said follower including a radially inner follower and a radially outer follower for respectively rotationally engaging the inner and outer cam tracks, the radially inner follower and radially outer follower being rotationally fixed to one another;
   a biasing member disposed about said pin to bias the radially inner and radially outer followers and the inner and outer cam tracks against one another;
   said cam and said follower being axially separable along the rotational axis during rotational engagement of the inner and outer cam tracks and the radially inner and radially outer followers.

8. The hinge of claim 7, further comprising:
   a locking member for engaging an end of said pin to retain said cam and said follower about said pin.

9. The hinge of claim 7 wherein an interface between the inner and outer cam tracks and the radially inner and radially outer followers respectively defines a bias position resisting relative rotation.

10. The hinge of claim 7 wherein an interface between the radially inner and radially outer cam tracks and the inner and outer followers provides an unstable closed position for the hinge.

11. The hinge of claim 7 wherein the inner and outer cam tracks include a detent for retaining the radially inner and radially outer followers when relative rotation between the inner and outer cam tracks and the radially inner and radially outer followers is about 180 degrees.

* * * * *

UNITED STATES PATENT AND TRADEMARK OFFICE
CERTIFICATE OF CORRECTION

| | |
|---|---|
| PATENT NO. | : 7,373,692 B2 |
| APPLICATION NO. | : 11/149458 |
| DATED | : May 20, 2008 |
| INVENTOR(S) | : Tony Kfoury |

Page 1 of 1

It is certified that error appears in the above-identified patent and that said Letters Patent is hereby corrected as shown below:

In the Claims:

Claim 6   Col. 7, line 57   Please delete the semi-colon ";" after the word "comprising" and insert a colon -- : -- in its place.

Signed and Sealed this

Sixteenth Day of December, 2008

JON W. DUDAS
*Director of the United States Patent and Trademark Office*